United States Patent [19]

Mark et al.

[11] 4,454,308

[45] Jun. 12, 1984

[54] RUBBERY POLYARYLATES

[75] Inventors: Victor Mark, Evansville; Charles V. Hedges, Mt. Vernon, both of Ind.

[73] Assignee: General Electric Company, Mt. Vernon, Ind.

[21] Appl. No.: 447,092

[22] Filed: Dec. 6, 1982

[51] Int. Cl.³ .............................................. C08G 63/18
[52] U.S. Cl. ................................... 525/444; 525/442; 528/125; 528/128; 528/173; 528/176; 528/191; 528/193; 528/194
[58] Field of Search ............... 528/125, 128, 173, 176, 528/191, 193, 194; 525/442, 444

[56] References Cited

U.S. PATENT DOCUMENTS

| | | | |
|---|---|---|---|
| 3,317,464 | 5/1967 | Conix | 528/176 |
| 3,351,624 | 11/1967 | Conix | 528/176 |
| 3,498,950 | 3/1970 | Shatz et al. | 528/176 |
| 4,294,956 | 10/1981 | Berger et al. | 528/176 |

*Primary Examiner*—Lester L. Lee
*Attorney, Agent, or Firm*—Martin B. Barancik; Myron B. Kapustij

[57] ABSTRACT

There are provided novel polyarylates exhibiting rubbery or elastomeric properties which are derived from (i) at least one aromatic dicarboxylic acid or a reactive derivative thereof, and (ii) at least one dihydricphenol which contains as the briding group joining the aromatic residues a long straight chain 1,1-alkylidene radical.

35 Claims, No Drawings

RUBBERY POLYARYLATES

BACKGROUND OF THE INVENTION

Polyarylates resins are known high molecular weight thermoplastic polymers possessing many advantageous physical properties. They are generally linear polymers containing repeating aromatic ester structural units in the polymer chain. The polyarylates may be derived from dihydric phenols and aromatic dicarboxylic acids or their reactive derivatives.

It has now been discovered that polyarylates can be provided which while retaining, to a substantail degree, substantially most of their other advantageous properties, such as for example, toughness, impact strength, and the like, also exhibit rubbery or elastomeric properties, are easier to process, and exhibit improved impact strength.

SUMMARY OF THE INVENTION

In accordance with the instant invention there are provided novel polyarylate resins exhibiting rubbery or elastomeric properties such as, for example, flexibility, elasticity, and shape memory while retaining, to a substantial degree, substantially most of the other advantageous properties of polyarylates such as, for example, toughness, impact strength, flexibility, and the like. Additionally, the polyarylates of the instant invention also exhibit improved impact strengths and improved processability. In the form of films the instant polyarylates exhibit a smooth and soft hand as compared to films formed of currently available polyarylate resins.

The polyarylates of the instant invention are derived from aromatic dicarboxylic acid or their reactive derivatives and certain specific dihydric phenols, i.e., those dihydric phenols which contain long chain alkylidene groups bridging the two aromatic groups.

DESCRIPTION OF THE INVENTION

In one embodiment of the instant invention there are provided novel high molecular weight polyarylate resins exhibiting a great degree of rubbery or elastomeric properties, e.g., elasticity, shape memory, low second order glass transition temperatures ($T_g$), and the like. These polyarylates are obtained by the reaction of (i) at least one aromatic dicarboxylic acid or a reactive derivative thereof, and (ii) at least one certain specific dihydric phenol.

The dihydric phenols utilized in the formation of the polyarylates of the instant invention are represented by the general formula

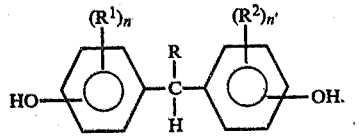

wherein:

R is selected from long straight chain alkyl radicals containing from 8 to about 30 carbon atoms;

each $R^1$ is independently selected from halogen, monovalent hydrocarbon, and monovalent hydrocarbonoxy radicals;

each $R_2$ is independently selected from halogen, monovalent hydrocarbon, and monovalent hydrocarbonoxy radicals; and n and n' are independently selected from whole numbers having a value of from 0 to 4 inclusive.

In the dihydric phenol compounds of Formula I when more than one $R^1$ substituent is present, i.e., when n is 2–4, they may be the same or different. The same is true for the $R^2$ substituent. Likewise, if both $R^1$ and $R^2$ substituents are present they may be the same or different. The positions of the hydroxyl groups and $R^1$ and $R^2$ on the aromatic nuclear residues can be varied in the ortho, meta, or para positions and the grouping can be in a vicinal, asymmetrical or symmetrical relationship where two or more ring carbon atoms of the aromatic hydrocarbon residue are substituted with $R^1$ and/or $R^2$ and hydroxyl groups.

The monovalent hydrocarbon radicals represented by $R^1$ and $R^2$ include the alkyl, aryl, alkaryl and aralkyl radicals. The monovalent hydrocarbonoxy radicals represented by $R^1$ and $R^2$ include the alkoxy and aryloxy radicals.

The preferred halogen radicals represented by $R^1$ and $R^2$ are chlorine and bromine. The preferred alkyl radicals represented by $R^1$ and $R^2$ are the straight chain and branched alkyl radicals containing from 1 to about 6 carbon atoms. Preferred aryl radicals represented by $R^1$ and $R^2$ are those containing from 6 to 12 carbon atoms, e.g., biphenyl, phenyl, napthyl. Preferred alkaryl and aralkyl radicals represented by $R^1$ and $R^2$ are those containing from 7 to about 14 carbon atoms, e.g., benzyl, ethylphenyl, and the like. Preferred alkoxy radicals represented by $R^1$ and $R^2$ are those containing from 1 to about 6 carbon atoms, e.g., methoxy, ethoxy, propoxy, and the like, while the preferred aryloxy radicals are those containing from 6 to 12 carbon atoms, e.g., phenoxy, and the like.

The preferred dihydric phenols of Formula I, for purposes of the instant invention, are the 4,4'-bisphenols.

Some nonlimiting illustrative examples of the dihydric phenols represented by Formula I include:

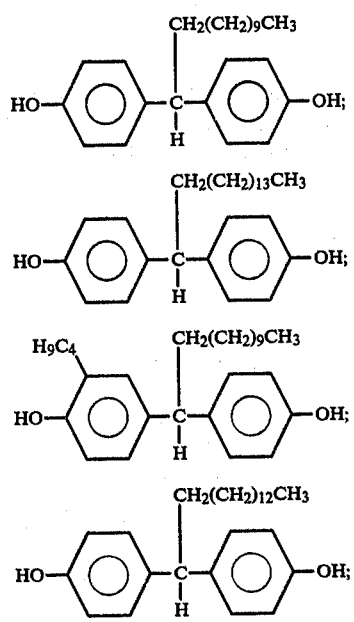

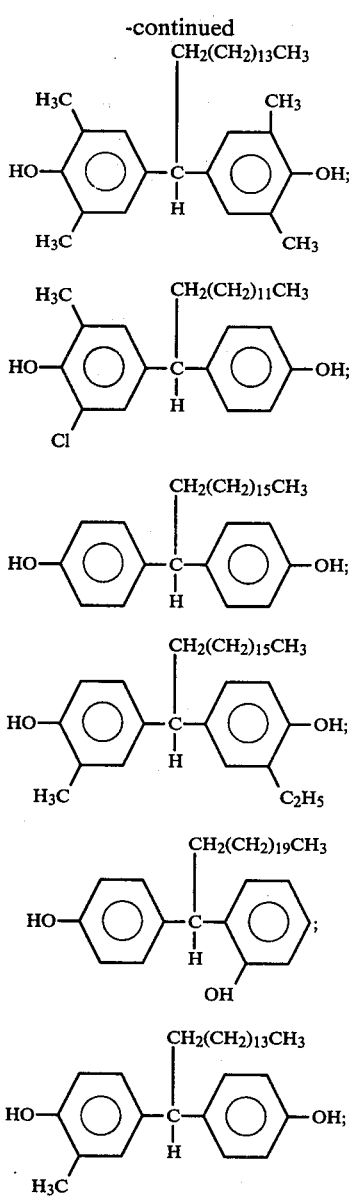

and the like. These dihydric phenols, as well as methods for their preparation, are disclosed in copending application of Victor Mark and Charles Hedges Ser. No. 447,030, which is hereby incorporated by reference and filed on the same day as this application.

As stated hereinafore the alkyl radical represented by R in Formula I is a straight chain alkyl radical containing from 8 to about 30 carbon atoms. It is critical to the present invention that said alkyl radical contain from 8 to about 30 carbon atoms. If said alkyl radical contains from 8 to about 30 carbon atoms the polyarylate derived from the dihydric phenols of Formula I exhibits rubbery or elastomeric properties, has a smooth and soft surface (hand), especially in thin films. If said alkyl radical contains less than 8 carbon atoms the resultant polyarylate derived from the dihydric phenols of Formula I does not exhibit, to any appreciable degree, these rubbery or elastomeric properties. If, on the other hand, said alkyl radical contains more than about 30 carbon atoms some of the other advantageous physical properties which render the polyarylates useful are seriously adversely affected.

In the preparation of the polyarylates of the instant invention only one dihydric phenol of Formula I may be employed. It is, of course, possible to employ a mixture of two or more different dihydric phenols of Formula I. Thus, where the term dihydric phenol is used herein it is meant to include therein mixtures of two or more different dihydric phenols of Formula I as well as individual dihydric phenols of Formula I.

The aromatic dicarboxylic acids which are reacted with the dihydric phenols of Formula I to produce the instant polyarylates are well known. In general, any aromatic dicarboxylic acid, or its reactive derivative such as the acid halide, conventionally used in the preparation of polyesters may be utilized. These aromatic dicarboxylic acids may be represented by the general formula $$HOOC-Ar-COOH \quad\quad II.$$

wherein Ar is selected from divalent aromatic radicals, preferably those containing from 6 to about 18 carbon atoms, such as phenylene, biphenylene, napthylene, and the like. These divalent aromatic radicals may be substituted, as for example with alkyl radicals or halogen radicals, or they may be unsubstituted. In formula II Ar may also be selected from radicals of The type $-Ar'-R^3-Ar'-$ wherein $Ar'$ is independently selected from divalent aromatic radicals of the type described for Ar, and $R^3$ is an alkylene radical containing from 2 to about 6 carbon atoms, and alkylidene radical containing from 1 to about 6 carbon atoms, a cycloalkylene radical containing from 4 to about 12 carbon atoms, and cycloalkylidene radicals containing from 4 to about 12 carbon atoms.

Preferred aromatic dicarboxylic acids are those represented by the general formula

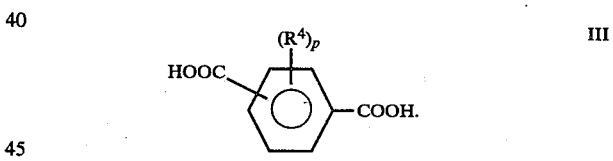

wherein $R^4$ is independently selected from alkyl radicals, preferably those alkyl radicals containing from 1 to about 6 carbon atoms; alkoxy radicals, preferably those alkoxy radicals containing from 1 to about 6 carbon atoms; and halogen radicals, preferably chlorine and bromine. In Formula III p represents a whole number having a value of from 0 to 4 inclusive. When more than one $R^4$ substituent is present they may be the same or different.

Some non-limiting illustrative examples of aromatic dicarboxylic acids represented by Formula III include isophthalic acid, terephthalic acid, naphthalene-2,6-dicarboxylic acid, and the like.

It is possible, in preparing the instant polyarylates, to utilize only one acid of Formula II or III, or to employ a mixture of two or more of these aromatic dicarboxylic acids. Thus, when the term aromatic dicarboxylic acid is used herein it is meant to include individual aromatic dicarboxylic acids and mixtures of two or more different aromatic dicarboxylic acids.

Instead of using the aromatic dicarboxylic acids per se it is possible, and sometimes even preferred, to use their respective reactive derivatives. The preferred reactive derivatives of these acids are the acid halides, with the acid dichlorides being the preferred acid halides. Thus, for example, instead of using isophthalic acid, terephthalic acid, or mixtures thereof, it is possible to employ terephthaloyl dichloride, isophthaloyl dichloride, or mixtures thereof.

The preparation of the instant polyarylates from the dihydric phenols of Formula I and the aromatic dicarboxylic acids of Formula II or their reactive derivatives may be accomplished by interfacial polymerization, solution condensation polymerization, melt condensation polymerization, and the like.

Most conveniently, the instant polyarylates may be prepared from nearly equimolar amounts of the appropriate dihydric phenols and the aromatic dicarboxylic acids or their reactive derivatives such as the acid chlorides by the interfacial polymerization technique. In accordance with the usual interfacial polymerization procedure, the reactants are present in different liquid phases which are immiscible and which, in the preparation of the present polymers, constitute two solvent media. Thus the dihydric phenol is dissolved in one solvent medium, the aromatic dicarboxylic acid or its reactive derivative such as the acid halide is dissolved in a second solvent medium immiscible with the first, and the solutions are combined. Normally, an alkaline aqueous medium serves as the solvent for the dihydric phenol, and an organic solvent is utilized for the acid or the acid dihalide, said organic solvent being so chosen that it either dissolves the polyarylate produced or serves as a swelling medium. Also present during the reaction are catalysts and chain stoppers or molecular weight regulators.

The catalysts which can be employed in the interfacial polymerization process may be any of the well known catalysts that aid the interfacial polymerization reaction of the dihydric phenol and the aromatic dicarboxylic acid or its reactive derivative. Suitable catalysts include tertiary amines, quaternary phosphonium compounds, quaternary ammonium compounds, amidines, and the like.

The molecular weight regulators employed may be any of the well known compounds which regulate the molecular weight of the polyarylates by the chain-stopping or terminating mechanism. These compounds include, but are not limited to, phenol, t-butyl phenol, and the like.

The temperature at which the polymerization reaction proceeds may vary from below 0° C. to above 100° C. The polymerization reaction proceeds satisfactorily at temperatures from room temperature (25° C.) to about 50° C.

The polyarylate polymers of the instant invention are highly flexible, exhibit elastomeric or rubbery characteristics, and have a smooth and relatively soft surface appearance (hand). Generally, the greater the number of carbon atoms present in R (the longer the alkyl chain) the greater the rubbery or elastomeric character of the polyarylates. These polyarylates, particularly those wherein R contain more than about 15 carbon atoms, also exhibit shape memory, i.e., when they are bent or deformed they will return to their original shape or form. The instant polymers also exhibit, at the same time, to a substantial degree substantially most of the other advantageous properties of polyarylates.

The instant polyarylates, due to their rather unique properties, are particularly useful in the film form as coatings or interlayers in laminar structures.

The instant polyarylates contain at least one repeating structural unit represented by the general formula

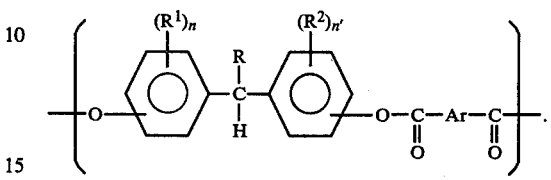

IV wherein R, $R^1$, $R^2$, Ar, n and n' are as defined hereinafore.

The polyarylates of the instant invention generally have a weight average molecular weight in the range of from about 10,000 to about 200,000, preferably in the range of from about 20,000 to about 100,000.

The polyarylates of the instant invention may optionally have admixed therewith the commonly known and used additives such as antioxidants; antistatic agents; fillers; glass fibers; ultraviolet radiation absorbers such as the benzophenones and the benzotriazoles; hydrolytic stabilizers such as the epoxides disclosed in U.S. Pat. Nos. 3,489,716; 4,138,379 and 3,839,247, all of which are incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali and alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366, all of which are incorporated herein by reference.

Another embodiment of the instant invention is an arylate copolymer derived from (i) at least one aromatic dicarboxylic acid or a reactive derivative thereof, (ii) at least one dihydric phenol of Formula I, and (iii) at least one dihydric phenol represented by the general formula

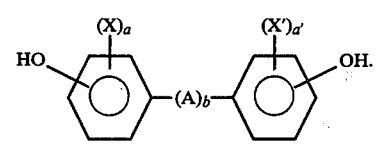

V wherein:

A represents an alkylene radical, preferably one containing from 2 to about 6 carbon atoms; a cycloalkylene radical, preferably one containing from 4 to about 12 carbon atoms; an alkylidene radical, preferably one containing from 1 to about 6 carbon atoms; a cycloalkylidene radical, preferably one containing from 4 to about 12 carbon atoms; —S—; —S—S—. —O—;

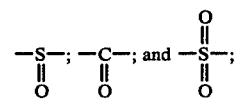

each X is independently selected from halogen radicals, monovalent hydrocarbon radicals, and monovalent hydrocarbonoxy radicals, and substituted monovalent hydrocarbonoxy radicals;

each X' is independently selected from halogen radicals, monovalent hydrocarbon radicals, monovalent hydrocarbonoxy radicals, and substituted monovalent hydrocarbon radicals;

a and a' are independently selected from whole numbers having a value of from 0 to 4 inclusive; and b is either zero or one.

The monovalent hydrocarbon radicals represented by X and X' include the alkyl radicals, both straight chain and branched, and preferably those that contain from 1 to about 6 carbon atoms; aryl radicals, preferably those containing from 6 to 12 carbon atoms such as phenyl, naphthyl, biphenyl, and the like; alkaryl radicals, preferably those containing from 7 to about 14 carbon atoms; and the aralkyl radicals, preferably those containing from 7 to about 14 carbon atoms.

The substituted monovalent hydrocarbon radicals are the alkyl, aryl, alkaryl and aralkyl radicals which contain at least one inorganic substituent group such as, for example, a halogen group.

The monovalent hydrocarbonoxy radicals include the alkoxy, preferably those containing from 1 to about 6 carbon atoms; and the aryloxy radicals, preferably those containing from 6 to 12 carbon atoms.

The preferred halogen radicals are chlorine and bromine.

In the dihydric phenol compounds represented by Formula V when more than one X substituent is present, they may be the same or different. The same is true for the X' substituents. Likewise, the X and X' substituents may be identical or different. Where b is zero in Formula V the aromatic rings are directly joined with no intervening alkylene or other bridge. The positions of the hydroxyl groups and X and X' on the aromatic nuclear residues can be varied in the ortho, meta or para positions and the groupings can be in a vicinal, asymmetrical or symmetrical relationship, where two or more ring carbon atoms of the aromatic hydrocarbon residue are substituted with X or X' and hydroxyl groups.

Some illustrative non-limiting examples of suitable dihydric phenols of Formula V include:
2,2-bis(4-hydroxyphenyl)propane (bisphenol-A);
1,1-bis(4-hydroxyphenyl)cyclohexane;
2,2-bis(4-hydroxyphenyl)hexane;
bis(3-methyl-4-hydroxyphenyl)methane;
4,4'-thiodiphenol;
3,3-bis(3,5-dibromo-4-hydroxyphenyl)hexane;
bis(3,5-diisopropyl-4-hydroxyphenyl)sulfoxide;
bis(3,5-dimethyl-4-hydroxyphenyl)sulfone;
3,3'-diethyl-4,4'-dihydroxydiphenyl; and the like. A variety of additional dihydric phenols of Formula V are disclosed in U.S. Pat. Nos. 2,999,835; 3,028,365; 3,153,008; 2,288,282; 2,739,171 and 3,148,172, all of which are incorporated herein by reference.

The amount of the dihydric phenol of Formula I utilized in the production of the polyarylates of this embodiment is an amount effective to impart elastomeric or rubbery properties to said polyarylates. Generally this amount ranges from about 1 to about 90 weight percent, preferably from about 2 to about 80 weight percent, and more preferably from about 5 to about 70 weight percent, based on the total amount of the dihydric phenols of Formulae I and V employed. Generally, if less than about 1 weight percent of the dihydric phenol of Formula I is employed there is no appreciable increase in the elastomeric or rubbery properties of the arylate copolymer of this embodiment. If more than about 1 weight percent of the dihydric phenol of Formula I is employed, the resulting copolymer begins to exhibit elastomeric or rubbery properties.

The copolymers of the instant invention also exhibit improved impact strengths as compared to presently available polyarylates, e.g., polyarylates derived from bisphenol-A. It is known in the art to provide polyarylate compositions exhibiting improved impact strengths by admixing with the polyarylate resin certain impact modifiers. While the addition of these impact modifying additives to the polyarylate resin results in polyarylate compositions exhibiting improved impact strengths, it also sometimes adversely affects some of the other advantageous properties of the polyarylates such as, for example, optical clarity, thermal aging, color, and thermal stability, and often results in phase separation. With the copolymers of the instant embodiment, since there is no additive involved these aforementioned disadvantages are avoided.

The copolyarylates of the instant embodiment also exhibit improved surface appearance or hand. That is to say, these copolyarylates exhibit a soft and smooth hand as compared to presently available polyarylates, e.g., those derived from bisphenol-A.

The upper limit of the amount of the dihydric phenol of Formula I that may be used depends upon the properties that it is desired for the copolyarylate of this embodiment to exhibit. Thus, for example, if polyarylates exhibiting a great degree of rubbery or elastomeric properties and a very smooth and soft hand are desired, a relatively large amount of the dihydric phenol of Formula I is utilized. If a polyarylate exhibiting a lesser degree of rubbery and elastomeric characteristics is desired, a smaller amount of the dihydric phenol of Formula I is employed.

Generally, if a relatively large amount of a dihydric phenol of Formula I is utilized, especially one where the alkyl groups represented by R contain a large number of carbon atoms, while the elastomeric character of the polyarylate is enhanced the heat distortion temperature of the resin is decreased. Therefore, in order to obtain a copolyarylate exhibiting an optimum combination of properties, e.g., improved impact strength, elastomeric or rubbery characteristics, and acceptable heat distortion temperatures, the amount of the dihydric phenol of Formula I employed, based on the total amount of dihydric phenols of Formulae I and V used, is an amount which is effective to improve the impact strength of the resin and to impart rubbery or elastomeric properties thereto but insufficient to significantly deleteriously affect the other properties of the resins, particularly the heat distortion temperature thereof. This amount is generally in the range of from about 1 to about 25 weight percent.

The procedure for preparing the copolyarylates of the instant embodiment is generally similar to that described hereinafore for the preparation of the polyarylates. However, in the preparation of the copolyarylates of this embodiment both the dihydric phenol of Formula I and the dihydric phenol of Formula V are coreacted with the aromatic dicarboxylic acid.

The copolyarylates of this embodiment may optionally contain admixed therewith the various additives described hereinafore such as antioxidants, fillers, glass fibers, ultraviolet radiation absorbers, hydrolytic stabilizers, flame retardants, and the like.

Yet another embodiment of the instant invention is a physical blend of (i) at least one polyarylate resin derived from (a) at least one dihydric phenol of Formula I and (b) at least one aromatic dicarboxylic acid of Formula II (hereinafter referred to as resin "A"); and (ii) at least one polyarylate resin derived from (a) at least one dihydric phenol of Formula V and (b) at least one aromatic dicarboxylic acid of Formula II (hereinafter referred to as resin "B").

The resulting blends, by virtue of the presence therein of the polyarylate resin "A" exhibit improved impact resistance, and rubbery or elastoemric characteristics as compared with polyarylate resins "B".

These blends are prepared by first formulating the respective polyarylate resins, i.e., resins "A" and resins "B", and mixing these two different resins together to form the blends of this embodiment.

The method of blending resins "A" and "B" together is not critical and does not constitute part of this invention. One method of preparing the instant blends, for example, comprises blending the two resins in powder form or granular form, extruding the blend, chopping into pellets, and re-extruding.

The amount of polyarylate resin "A" present in these blends is an amount which is effective to improve the impact strength of the blends and to impart thereto rubbery or elastomeric properties. Generally this amount is in the range of from about 1 to about 90 weight percent, based on the weight of the blend. Generally, the larger the amount of resin "A" present, the greater the degree of rubbery or elastomeric properties exhibited by the blends. However, if relatively large amounts of resin "A" are present in the blends the heat distortion temperatures of the blends is lowered. In order to obtain blends exhibiting an optimum range of properties, e.g., improved impact strengths, elastic or rubbery properties, and good heat distortion temperatures, the blends should contain an amount of resin "A" effective to improve the impact strength of the blend and to impart rubbery and elastomeric properties thereto but insufficient to significantly deleteriously affect the other properties of the blends, particularly the heat distortion temperature. Generally, this amount is in the range of from about 1 to about 25 weight percent, based on the weight of the blend.

The blends of the instant embodiment may optionally contain admixed therewith the various additives described hereinafore such as, for example, fillers, glass fibers, antioxidants, ultraviolet radiation absorbers, flame retardants, hydrolytic stabilizers, and color stabilizers.

When formulating the copolyarylates and the blends of the instant invention it is generally preferred, in order to obtain resins with an all around range of good properties, to utilize dihydric phenols of Formula V wherein b is one and A is selected from alkylene radicals, cycloalkylene radicals, alkylidene radicals, and cycloalkylidene radicals. Of these the 4,4'-bisphenols are preferred, with bisphenol-A being the preferred 4,4'-bisphenol.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

The following example illustrates the preparation of a polyarylate of the instant invention.

EXAMPLE 1

This example illustrates the preparation of poly(4,4'-dodecylidenebisphenol isophthalate).

To a reaction vessel there were added 35.5 grams (0.1 mole) of 4,4'-dodecylidenebisphenol, 0.24 gram of phenol, 0.28 milliliter of triethylamine, 300 milliliters of methylene chloride, and 400 milliliters of water. This mixture was well stirred and to this stirred mixture was added dropwise a solution of 20.3 grams (0.1 mole) of isophthaloyl dichloride in 50 milliliters of methylene chloride, while maintaining the pH of the resulting mixture at 11 by the addition of a 25% aqueous sodium hydroxide solution via an automated titrator. When the pH remained constant the organic and aqueous phases were separated, the methylene chloride phase was washed with 0.01N aqueous HCl, followed by two water washes. The organic layer was then dried with silica gel, filtered and the polyarylate resin precipitated by methanol.

After drying in a vacuum oven, the polyarylate resin was found to have an intrinsic viscosity in methylene chloride at 25° C. of 0.499 dl/gm. and a Tg of 65.8° C.

When cast from a methylene chloride solution, the polymer yielded a transparent, tough, flexible and rubbery film with a soft and smooth hand.

In contrast to the polyarylate of Example 1 a conventional polyarylate which is derived from bisphenol-A and isophthalic acid has a Tg of 185° C., while a conventional polyarylate derived from bisphenol-A and a 50/50 weight mixture of isophthalic acid and terephthalic acid has a Tg of 194° C.

Thus the instant polyarylates exhibit rubbery or elastomeric properties as compared with conventional polyarylates.

Obviously, other modifications and variations of the present invention are possible in light of the above teachings. It is, therefore, to be understood that changes may be made in the particular embodiments of the invention described which are within the full intended scope of the invention as defined by the claims.

What is claimed is:

1. Polyarylate compositions exhibiting rubbery and elastomeric properties and shape memory comprised of at least one polyarylate obtained by the reaction of:
   (i) at least one aromatic dicarboxylic acid or a reactive derivative thereof; and
   (ii) at least one dihydric phenol represented by the general formula

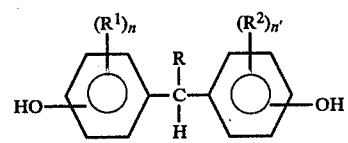

wherein:
R is selected from long straight chain alkyl radicals containing from about 15 to about 30 carbon atoms,
each $R^1$ is independently selected from halogen, monovalent hydrocarbon, and monovalent hydrocarbonoxy radicals, and n and n' are independently selected from whole numbers having a value of from 0 to 4 inclusive.

2. The compositions of claim 1 wherein said halogen radicals are selected from bromine and chlorine radicals.

3. The compositions of claim 1 wherein said monovalent hydrocarbon radicals are selected from alkyl radicals, aryl radicals, alkaryl radicals, and aralkyl radicals.

4. The compositions of claim 3 wherein said monovalent hydrocarbon radicals are selected from alkyl radicals.

5. The compositions of claim 4 wherein said alkyl radicals contain from 1 to about 6 carbon atoms.

6. The compositions of claim 1 wherein said monovalent hydrocarbonoxy radicals are selected from alkoxy and aryloxy radicals.

7. The compositions of claim 1 wherein n and n' are both 0.

8. The compositions of claim 1 wherein at least one of n and n' is zero.

9. The compositions of claim 1 wherein said dihydric phenol is a 4,4'-bisphenol.

10. The compositions of claim 9 wherein n and n' are both zero.

11. The compositions of claim 1 wherein said reactive derivative of said aromatic dicarboxylic acid is an acid dihalide.

12. The compositions of claim 11 wherein said acid dihalides are acid dichlorides.

13. The compositions of claim 12 wherein said acid dichloride is isophthaloyl dichloride.

14. The compositions of claim 1 wherein said polyarylate is obtained by the reaction of (i), (ii) and (iii) at least one dihydric phenol represented by the general formula

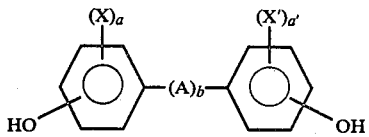

wherein:
A represents an alkylene radical containing from 2 to about 6 carbon atoms, a cycloalkylene radical containing from 4 to about 12 carbon atoms, an alkylidene radical containing from 1 to about 6 carbon atoms, a cycloalkylidene radical containing from 4 to about 12 carbon atoms, —S—, —S—S—, —O—,

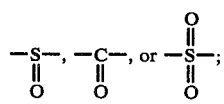

each X is independently selected from halogen radicals, monovalent hydrocarbon radicals, monovalent hydrocarbonoxy radicals, and inorganic moiety substituted monovalent hydrocarbon radicals;
each X' is independently selected from halogen radicals, monovalent hydrocarbon radicals, monovalent hydrocarbonoxy radicals, and inorganic moiety substituted monovalent hydrocarbon radicals;
a and a' are independently selected from whole numbers having a value of from 0 to 4 inclusive; and
b is either zero or one.

15. The compositions of claim 14 wherein said dihydric phenol (ii) reactant is present in an amount effective to impart rubbery or elastomeric properties to said compositions.

16. The compositions of claim 15 wherein b is one.

17. The compositions of claim 16 wherein A is selected from alkylene radicals, cycloalkylene radicals, alkylidene radicals, and cycloalkylidene radicals.

18. The compositions of claim 17 wherein a and a' are both zero.

19. The compositions of claim 15 wherein the monovalent hydrocarbon radicals represented by $R^1$ and $R^2$ are selected from alkyl, aryl, alkaryl and aralkyl radicals.

20. The compositions of claim 19 wherein said monovalent hydrocarbon radicals are selected from alkyl radicals.

21. The compositions of claim 20 wherein said dihydric phenols (ii) are the 4,4'-bisphenols.

22. The composition of claim 21 wherein n and n' are both zero.

23. The compositions of claim 22 wherein said reactive derivative of said aromatic dicarboxylic acid is an acid dihalide.

24. The compositions of claim 23 wherein said acid dihalides are the acid dichlorides.

25. The compositions of claim 1 which further contain, in admixture, at least one polyarylate obtained from the reaction of:
(iv) at least one aromatic dicarboxylic acid or a reactive derivative thereof; and
(v) at least one dihydric phenol represented by the general formula

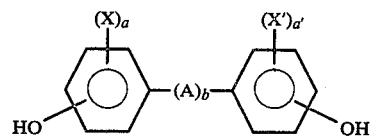

wherein
A represents an alkylene radical containing from 2 to about 6 carbon atoms, a cycloalkylene radical containing from 4 to about 12 carbon atoms, an alkylidene radical containing from 1 to about 6 carbon atoms, a cycloalkylidene radical containing from 4 to about 12 carbon atoms, —S—, —S—S—, —O—,

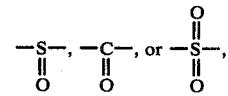

each X is independently selected from halogen, monovalent hydrocarbon, monovalent hydrocarbonoxy, and inorganic moiety substituted monovalent hydrocarbon radicals,
each X' is independently selected from halogen, monovalent hydrocarbon, monovalent hydrocarbonoxy, and inorganic moiety substituted monovalent hydrocarbon radicals,
b is either one or zero, and
a and a' are independently selected from whole numbers having a value of 0 to 4 inclusive.

26. The compositions of claim 25 which contain an amount of the reaction product of (i) and (ii) effective to impart rubbery or elastomeric properties thereto.

27. The compositions of claim 26 wherein b is one.

28. The compositions of claim 27 wherein A is selected from alkylene, cycloalkylene, alkylidene, and cycloalkylidene radicals.

29. The compositions of claim 28 wherein a and a' are zero.

30. The compositions of claim 29 wherein said dihydric phenols are the 4,4'-bisphenols.

31. The compositions of claim 28 wherein the dihydric phenols (ii) are the 4,4'-bisphenols.

32. The compositions of claim 31 wheren n and n' are both zero.

33. The compositions of claim 32 wherein the reactive derivatives of the aromatic dicarboxylic acids are the acid dihalides.

34. The compositions of claim 18 wherein said dihydric phenol of (iii) is bisphenol-A.

35. The compositions of claim 29 wherein said dihydric phenol of (v) is bisphenol-A.

* * * * *